United States Patent [19]
Noda et al.

[11] Patent Number: 5,216,648
[45] Date of Patent: Jun. 1, 1993

[54] OBJECTIVE LENS DRIVE APPARATUS APPLICABLE TO OPTICAL DISK APPARATUS

[75] Inventors: Yasushi Noda; Yoshiki Kirinoe, both of Tokyo; Masashi Tanaka, Musashino, all of Japan

[73] Assignee: Teac Corporation, Japan

[21] Appl. No.: 511,063

[22] Filed: Apr. 19, 1990

[30] Foreign Application Priority Data

Apr. 21, 1989 [JP] Japan ................................. 1-103245

[51] Int. Cl.$^5$ .......................... G11B 7/00; G11B 17/00
[52] U.S. Cl. .................................. 369/44.14; 369/121; 369/244
[58] Field of Search ............... 369/44.14, 44.15, 44.16, 369/44.22, 247, 244, 238, 130, 120, 121, 32, 112; 356/356, 358

[56] References Cited

U.S. PATENT DOCUMENTS

| | | | |
|---|---|---|---|
| 4,481,613 | 11/1984 | Yokota | 369/44.14 |
| 4,641,020 | 2/1987 | Iwai | 369/44.14 |
| 4,769,803 | 9/1988 | Yamamiya | 369/44.14 |
| 4,797,866 | 1/1989 | Yoshikawa | 369/44.14 |
| 4,855,982 | 8/1989 | Orlicki et al. | 369/44.16 |
| 4,878,214 | 10/1989 | Hinotani | 369/44.15 |
| 4,943,166 | 7/1990 | Yamashita | 369/32 |
| 4,971,442 | 11/1990 | Okutani et al. | 356/356 |
| 5,018,836 | 5/1991 | Noda et al. | 369/44.16 |
| 5,103,345 | 4/1992 | Watanabe et al. | 369/44.16 |

Primary Examiner—Aristotelis Psitos
Assistant Examiner—Nabil Hindi
Attorney, Agent, or Firm—Andrus, Sceales, Starke & Sawall

[57] ABSTRACT

An objective lens drive apparatus applicable to an optical disk apparatus includes a base member disposed so as to oppose a recording surface of an optical disk and so as to be movable in a direction of a radius of the optical disk, a support mechanism supporting an objective lens on the base member and so as to be movable in the direction of the direction of the radius of the optical disk. The objective lens drive apparatus also includes a drive mechanism acting upon the support mechanism to move the objective lens on the base member, a displacement detector detecting a displacement of the objective lens on the base member, a controller controlling the drive mechanism so that the objective lens is maintained at a required position on the base member.

9 Claims, 5 Drawing Sheets

OBJECTIVE LENS DRIVE APPARATUS APPLICABLE TO OPTICAL DISK APPARATUS

BACKGROUND OF THE INVENTION

The present invention relates to an objective lens drive apparatus applicable to optical disk apparatus, and more particularly, to an objective lens drive apparatus that can drive an objective lens to focus onto an optical disk an optical beam from a light source, in a radial direction of the optical disk.

For example, in optical disk apparatus, information recorded on an optical disk is detected optically by an optical pickup provided so as to be movable in a radial direction. In order to focus light onto a predetermined track, this type of optical pickup is provided with an objective lens drive apparatus to drive an objective lens in a radial direction (the tracking direction). The inventor of the present application has proposed the following objective lens drive apparatus in U.S. patent application Ser. No. 472,745 (Filling Data Jan. 31, 1990). This apparatus has a base member that moves in a radial direction of a disk, a support unit that is provided on the base member, an objective lens supported by the support unit and a tracking coil provided to the support. When a drive current flows through the tracking coil, the field of the tracking coil with respect to the field of a magnet on the base member repulse each other and the light that passes through the position of the objective lens is controlled so that the light that passes thought the objective lens is focussed on the required track.

The support unit has an objective lens holder that directly supports the objective lens, and a supporting member that elastically supports the objective lens holder. The objective lens is supported by this supporting member so as to be movable in the direction of the radius of the optical disk. When the drive force from the tracking coil acts, the supporting member bends in the direction of the radius of the optical disk and so the objective lens is displaced in the direction of the radius of the optical disk. After the optical pickup itself has been moved by seek control, to the position of the objective track on the optical disk, this objective lens drive apparatus supplies a drive current to the tracking coil so the position of the objective lens is controlled (by tracking control) so that the optical beam passing through the objective lens is accurately irradiated to the objective track.

When there is seek operation to move the optical pickup in the direction of the radius of the optical disk, the light reflected from the recording surface of the optical disk is detected via the objective lens. Then, a track crossing signal is generated in accordance with the passing of the optical beam over the track on the disk. This track signal is used as the basis for determining the speed of movement of the optical pickup. A characteristics of this speed of movement is such that the speed of the optical pickup is controlled during seek operation so that it has the required characteristic.

It can be considered that in order to reduce the access time in optical disk apparatus, this seek operation should be made faster. If this is done, then it is necessary to move the optical pickup at a speed faster than that obtainable by conventional apparatus. If the seek operation is made faster, then the acceleration on the objective lens supported on the supporting member and the objective lens holder both become greater. This is, that the supporting member bends in the direction of the radius of the optical disk and the position of the objective lens deviates with respect to the base member, or the objective lens vibrates in the direction of the radius of the optical disk. As a result, the speed of detection of the optical pickup is no longer accurate with respect to the track cross signals that perform the seek operation.

SUMMARY OF THE PRESENT INVENTION

Accordingly, it is an object of the present invention to provide an objective lens drive apparatus which is novel and effective in eliminating the problems in the conventional art and which have been described above.

A more specific object of the present invention is to provide an objective lens drive apparatus that prevents the displacement in the direction of the radius of the optical disk, of the objective lens with respect to the base when a base member and an objective lens supported elastically on a base member are moved at high speed to the objective track.

The above objects of the present invention is achieved by an objective lens drive apparatus applicable to an optical disk apparatus comprising a base member disposed so as to oppose a recording surface of an optical disk upon which information has been recorded, and so as to be movable in a direction of a radius of the optical disk, a support mechanism supporting an objective lens that focuses a light beam from an external recording system and onto a recording surface of an optical disk, on the base member and so as to be movable in the direction of the radius of the optical disk, a drive mechanism acting upon the support mechanism to move the objective lens on the base member, in the direction of the radius of the optical disk, displacement detection means for detecting a displacement of the objective lens on the base member, and control means for controlling the drive mechanism on the basis of the displacement detected by the displacement detection means so that the objective lens is maintained at a required position on the base member.

Other objects and further features of the present invention will be apparent from the following detailed discription when read in conjunction with the accompanying drawings.

BRIEF DESCRIPTION OF THE DRAWINGS

FIGS. 5 through 5C are views describing the positions of a photo-diode and an interrupter plate;

DESCRIPTION OF THE PREFERRED EMBODIMENT

A description is given of an objective lens drive apparatus according to the resent invention with reference to FIGS.1 through 4.

In the figures, an objective lens drive apparatus 1 is provided at a position to the bottom of an optical disk (not indicated in the figure) and so as to be freely movable in the direction of the radius of an optical disk (hereinafter referred to as the tracking direction, that is: the direction indicated by the arrows $X_1$ and $X_2$). During seek operation when tracking detection is performed, this objective lens drive apparatus 1 moves at high speed in the direction indicated by the arrows $X_1$ and $X_2$.

In the figures, an objective lens holder 2 is formed of an insulating material such as ceramic, compound resin or the like. This objective lens holder 2 has an approximate H-shape across a section taken in the direction $X_1$-$X_2$. This objective lens holder 2 has a central member 2b having a mounting hole 2a, and six arm members 2c through 2h that extend from this central member 2b. The arm members 2g and 2h that extend in the direction of tracking are provided with interrupter plates 16 and 17 that extend further in the direction of tracking. In an upper surface of the objective lens holder 2 are formed bosses 2i and 2j that project externally into a portion that is a border between the central member 2b and the arm member 2g and 2h. In addition, similar bosses are also formed on the lower surface of the objective lens holder 2. An objective lens 3a engages with and is fixed by the mounting hole 2a of this objective lens holder 2. A focus drive coil 6 to which tracking drive coils 4 and 5 are fixed engages with and are fixed between arm members 2c and 2d. A focus drive coil 9 to which tracking drive coils 7 and 8 are fixed engages with and is fixed between arm members 2e and 2f. Rings 10 and 11 and flat spring members 12 through 15 have formed of either berrylium copper or phosphor copper and has conductivity. Each of the flat spring members 12 through 15 are formed of thin spring member portions 12a through 15a that are the elastic support members, and long members 12b through 15b to form T-shaped members at one end of the spring members. The T-shaped members comprise long members 12b through 15b and short members 12c through 15c. Holes in the T-shaped members are provided at the portion connecting the long members 12b through 15b and the short members 12c through 15c.

Rings 10 and 11 are fixed so as to surround the mounting hole 2a in the upper surface and a bottom surface of the central mounting hole 2a in the upper surface and a bottom surface of the central members 2b of the lens holder. A hole 12d of the flat spring member 12 engages with a boss 2i of the objective lens holder 2 and the long member portion 12b of a flat spring 12 is fixed to arm members 2c and 2e of the objective lens holder 2 and the central member portion 2b between these arm members 2c and 2e. In addition, the short member 12c of the flat spring member 12 is fixed to arm member 2g of the objective lens holder 2. In this manner, the flat spring member 12 is fixed to the upper surface of the objective lens holder 2 so that the spring member 12a of the flat spring member 12 extends from the arm member 2g of the objective lens holder 2 and in a direction parallel to the arm member 2e. The hole 13d of a flat spring member 13 engages with a boss 2j of the objective lens holder 2 and the long member portion 13b of the flat spring member 13 is fixed to the arm members 2d and 2f of the objective lens holder 2 and to the central member 2b between these arm members 2d and 2f. In addition, the short member 13c of the flat spring member 13 is fixed to the arm member 2h of the objective lens holder 2. In this manner, the flat spring member 13 is fixed to the upper surface of the objective lens holder 2 so that the spring member 13b of the flat spring member 13 extends from the distal end of the arm member 2h of the objective lens holder 2 and in a direction parallel to the arm member 2f. Flat spring members 14 and 15 are fixed in the same manner as the flat spring members 12 and 13 described above, to the lower surface of the objective lens holder 2, and the spring members 14a and 15a extend from the distal ends of the arm members 2g and 2h of the objective lens holder 2 and in a direction parallel to the arm members 2e and 2f.

The ring 10 fixed to the upper surface of the objective lens holder 2 and the spring members 12 and 13 are used to electrically connect between the focus coils 6 and 9 and to electrically connect the focus coils 6 and 9 with an external circuit.

The ends of the spring portions 12a through 15a of the flat spring members 12 through 15 are soldered to a wiring pattern of a flexible printed circuit board 20. At a distal end of a drawn portion 20a formed at an end of the flexible printed circuit board 20 is provided a connector 21. On this flexible printed circuit board 20 are formed circuits to drive the objective lens 3 and include drive circuits relating to focus control and tracking control. The flexible printed circuit board 20 is adhered to a metal plate 22 for reinforcing. The metal plate 22 is formed with cutouts 22a and 22d at positions 20 corresponding to the flat spring portions 12a through 15a. The ring 11 and the flat spring members 14 and 15 fixed to the bottom surface of the lens holder 2 are used to electrically connect between tracking coils and between the tracking coils and an external circuit.

Figure 1:
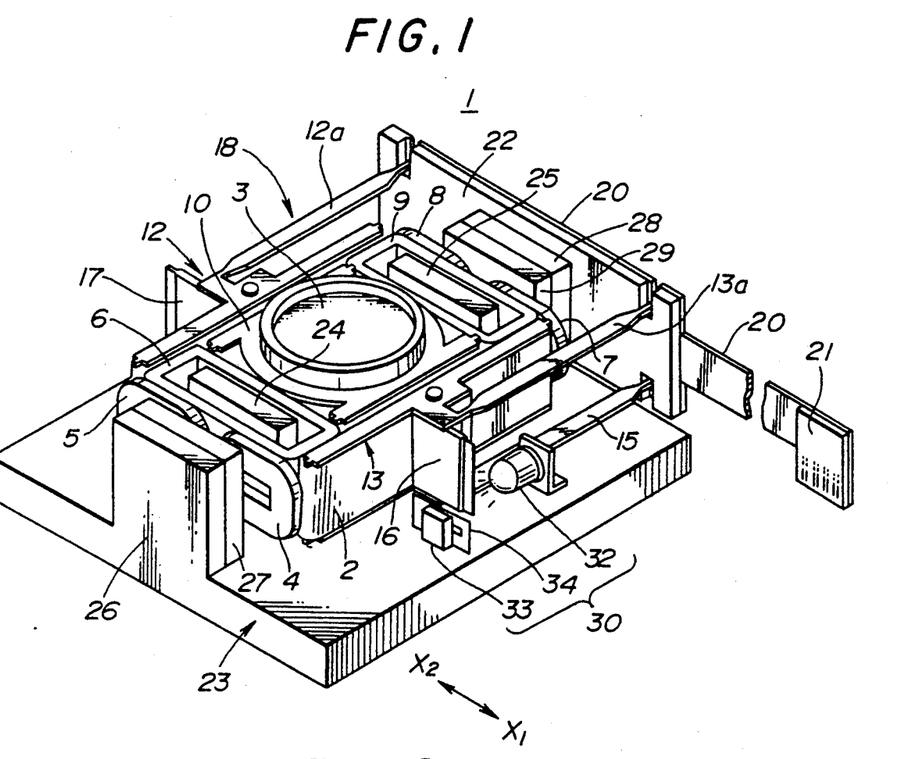
FIG. 1 is a perspective view of an embodiment of the objective lens drive apparatus according to the present invention.
Figure 2:
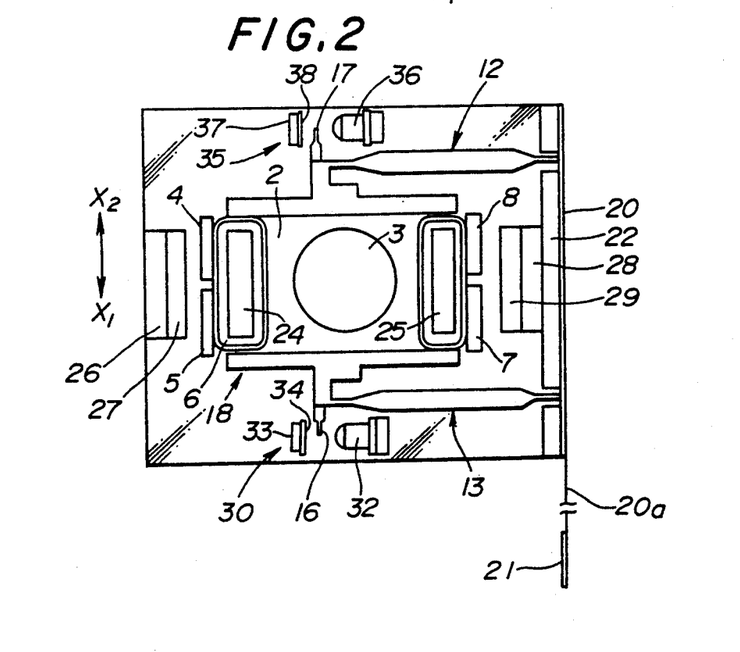
FIG. 2 is a plan view of the objective lens drive apparatus according to the present invention.
Figure 3:
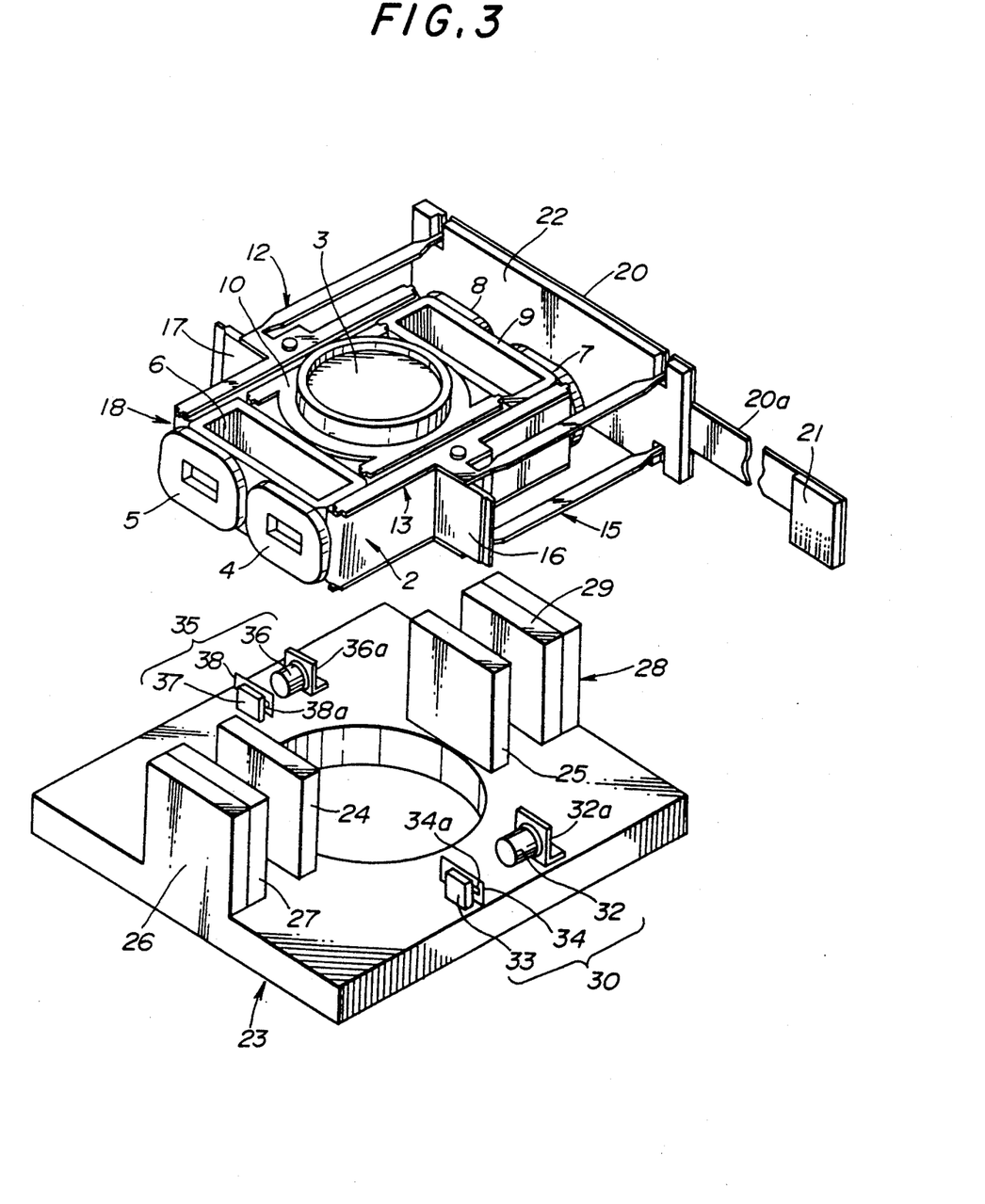
FIG. 3 is a perspective view indicating an objective lens drive apparatus in the status where the drive apparatus of the objective lens and the base member are separated.
Figure 4:
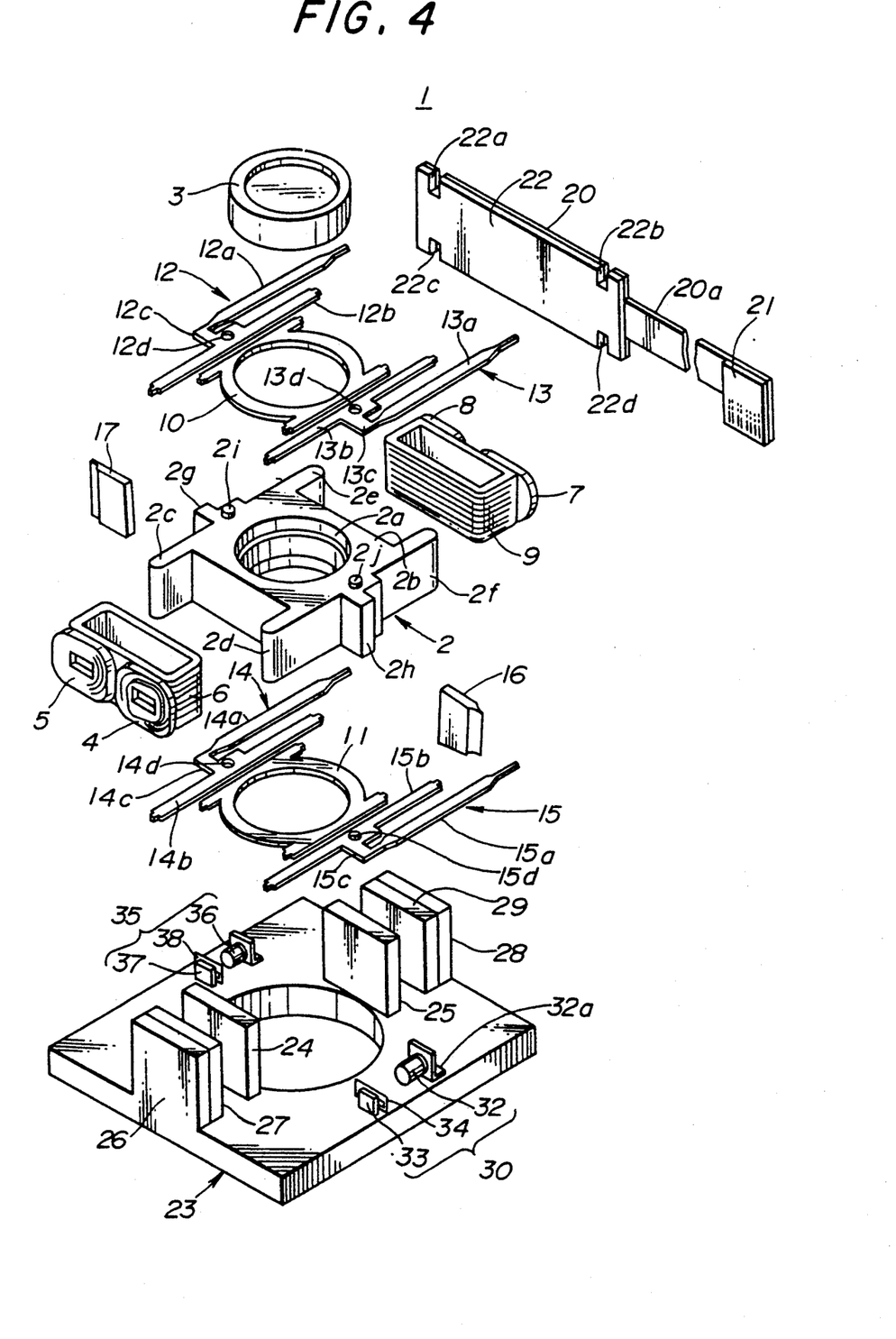
FIG. 4 is an exploded perspective view of an objective lens drive apparatus.

As has been described above, the objective lens holder 2, flat spring members 12 through 15, the focus coils 6 and 9, the tracking coils 4, 5, 7 and 8, the flexible printed circuit board 20 and the metal plate 22, etc. are formed as shown in FIG. 3, as a single objective lens drive unit 18. The metal plate 22 of this objective lens drive unit 18 forms a signal unit with the base member 23 and is fixed to a yoke 28 that extends from the upper surface. Accordingly, in the objective lens drive apparatus 1 that is configured as has been described above, the objective lens holder 2 is supported with respect to the base member 23, so as to be movable in the direction of tracking and in the direction perpendicular to the direction of tracking. In addition, in the objective lens drive apparatus 1 described above and as described in FIG. 1, the focus drive coils 6 and 9 are freely engageable with the yokes 24 and 25 on the base member 23. The tracking coils 4 and 5 oppose a permanent magnet 27 fixed to yoke portion 26 and the tracking coils 7 and 8 oppose a permanent magnet 29 fixed to yoke portion 28.

By supplying a focus control current to focus drive coils 6 and 9, an electromagnetic field is generated in the focus drive coils 6 and 9 to move the objective lens holder 2 up and down and so the focus control is performed. In addition, by supplying a tracking control current to the tracking coils 4, 5, 7 and 8, a magnetic force is generated in each of the tracking coils 4, 5, 7 and 8 so that the objective lens holder 2 is moved in the directions indicated by the arrows $X_1$ and $X_2$ so that tracking control is performed. A detector 30 detects the position in the direction of the arrows $X_1$ and $X_2$ of the objective lens drive unit 18 that supports the objective lens 3. This detector 30 includes a light-emitting diode 32 as the light emitting element and a photo-diode 33 as the light receiving element, and a slit plate 34 provided on the front surface of the photo diode 33. The light-emitting diode 32 is mounted to an L-shaped bracket 32a fixed to the base member 23. The light-emitting diode 32 irradiates a light beam in a horizontal direction. Then, the photo diode 33 is fixed to the base member 23 so that it opposes the light-emitting diode 32 across a gap. The slit plate 34 has a long slit 34a which is long in the direction of tracking and the light from the light-emitting diode 32 passes through this slit 34a and is irradiated to the photo diode 33. In this manner, the light passing through the slit 34a is irradiated to the photo diode 33 and so intensity even if there is unevenness in the outer portion of the distribution of the light irradiated from the light-emitting diode 32, that light which passes through the slit 34a is only that central portion of the light which has an even intensity distribution. Thus, the output for the photo diode 33 is stable.

A detector 35 is provided to the side end portion opposite the side on which the detector 30 is provided.

This detector 35 has the same configuration as the detector 30 described above, and therefore the description of it is omitted.

Figure 5A:
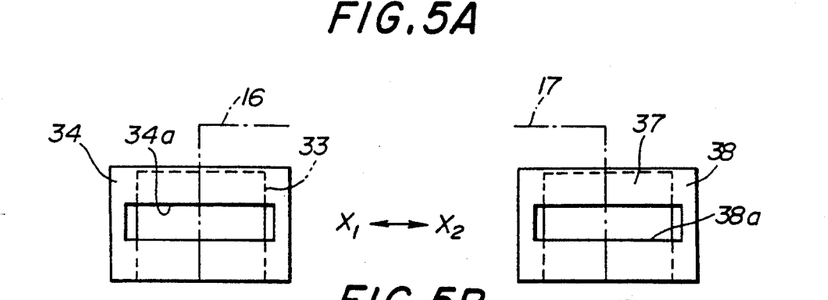
Figure 6:
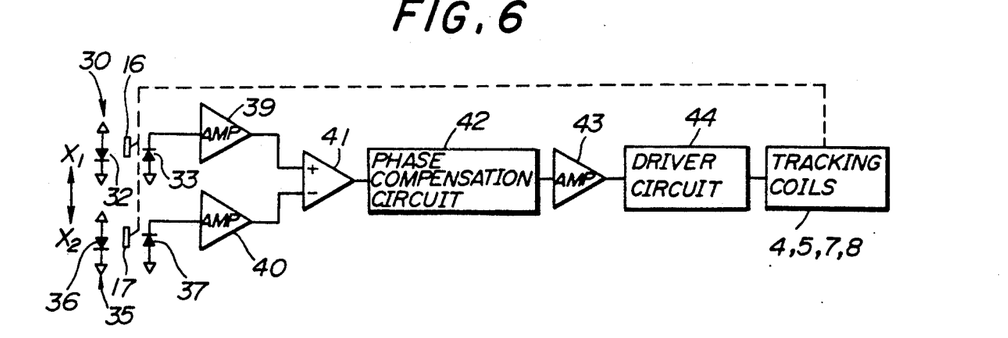
FIG. 6 is a block diagram of a feedback control circuit.

When the objective lens holder 2 is at a required position on the base member 23, the interrupter plates 16 and 17 provided at both sides of the objective lens holder 2 are, as indicated in FIG. 5A, positioned so as to interrupt approximately half of the light directed at the photo diodes 33 and 37. Accordingly, when the objective lens holder 2, that is to say, the objective lens 3 is maintained at a required position on the base member 23, the magnitudes of the output of the photo diodes 33 and 37 of the detectors 30 and 35 are approximately equal. The photo diodes 33 and 37 of the detectors 30 and 35 described above, are connected to a control circuit of a feedback control system indicated in FIG. 6. In FIG. 6, the photo diodes 33 and 37 output a current of a magnitude equal to the amount of light received. The output signals of the photo diodes 33 and are amplified by pickup amplifiers 39 and 40 and the signal from each of the pickup amplifiers 39 and 40 is input to a differential amplifier 41. The differential amplifier 41 supplies signal corresponding to the difference in the output signal from the photo diode 33 and 37 to a phase compensation circuit 42. As indicated in FIG. 5A, when the objective lens 3 is at a required position on the base member 23, the output of the photo diodes 33 and 37 are approximately equal and so the output of the differential amplifier 41 is approximately zero. In addition, the differential amplifier 41 outputs signal in accordance with the difference in the output signals from the photo diodes 33 and 37 and so external common-mode frequency components included in each of the photo diodes 33 and 37 are removed. A phase compensation circuit 42 performs phase compensation for the signal output from the differential amplifier 41 so that the required phase characteristics are obtained. The signal that are phase compensated by the phase compensation circuit 42 are amplified by an amplifier 43 and this amplified signal is then supplied to a driver circuit 44. The driver circuit supplies a drive current corresponding to an amount of displacement of the objective lens 3 with respect to the base member 23 in the direction of the tracking As a result, the objective lens holder 2 supporting the objective lens 3 returns to a required position by the electromagnetic force of the tracking coils 4, 5, 7 and 8.

The following is a description of the operation of the above described objective lens drive apparatus 1 when there is seek operation to detect a required track.

Figure 5B:
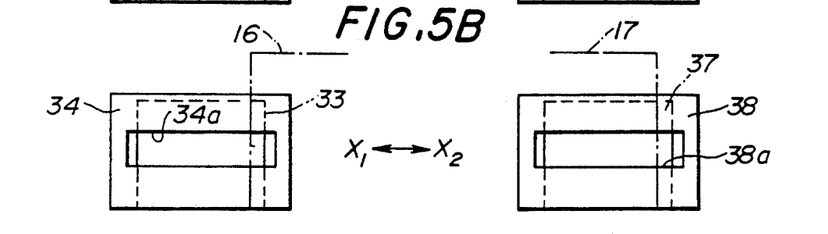

The base member 23 moves in the direction of the radius of the disk (the direction of the arrows $X_1$ and $X_2$) by the rotation of a tone arm (not indicated in the figure) for example. When the base member 23 moves at high speed, the objective lens drive unit 18 on the base member 23 has a large acceleration acting upon it. When the base member 23 is stopped, the objective lens 3 is held at a required position on the base member 23. Then, the interrupter plates 16 and 17 interrupt the light from the light-emitting diodes 32 and 36 as indicated in FIG. 5A. By the seek operation, when for example, the base member 23 begins to move at high speed in the direction of the arrow $X_1$, the force in the direction of the arrow $X_2$ acts on the objective lens drive unit 18. In the objective lens drive unit 18, as has already been described, the objective lens holder 2 is elastically supported by the flat spring members 12 through 15 and so when a force such as the one described above is generated, each of the flat spring members 12 through 15 bend and the objective lens 3 is displaced in the direction of the arrow $X_2$. As the result of this, the interrupter plates 16 and 17 move in the direction of the arrow $X_2$ as indicated in FIG. 5B and the amount of light that is received by the photo diode 33 is increased and the amount of light that is received by the photo diode 37 is reduced. Accordingly, the drive circuit 44 supplies a drive current to the tracking coils 4, 5, 7 and 8 so that the objective lens holder 2 returns to a required position, and the objective lens 3 returns to a required position on the base member 23.

Figure 5C:
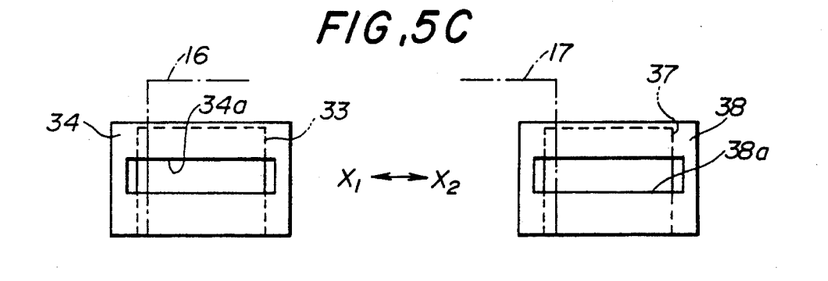

Also, when the objective lens 3 reaches the objective track position, the base member 23 stops. When the base member 23 has stopped, the base member 23 that is moving at high speed decelerates rapidly and so an inertia force acts in the direction of the arrow $X_1$ on the objective lens drive unit 18 on the base member 23. Accordingly, the flat spring members 12 through 15 bend in the direction of the arrow $X_1$ and the interrupter plates 16 and 17 are displaced in the direction of the arrow $X_1$ as indicated in FIG. 5C. Then, the amount of light received by the photo diode 33 is reduced and the amount of light received by the photo diode 37 is increased. As a result, the differential amplifier 41 outputs a negative signal in accordance with the difference between the two and the driver circuit 44 supplies a drive current to the tracking coils 4, 5, 7 and 8 so that the objective lens 3 returns to a required position on the base member 23.

In this manner, in the objective lens drive apparatus 1, the drive currents to the tracking coils 4, 5, 7 and 8 are controlled so that the objective lens 3 is held at a required position on a base member 23 even when a force corresponding to the degree of acceleration when there is high speed seek operation, acts on the objective lens drive unit 18. Because of this, position discrepancies of the objective lens 3 are eliminated when there is seek operation and it is possible to accurately detect track cross signals obtained by the light reflected from the disk recording surface when the objective lens 3 passes over each track. Then, it is possible to accurately measure the speed of movement of the optical pickup during seek operation and high-speed seek operation can then be stably performed.

Moreover, in the embodiment described above, there are provided two detectors 30 and 35 to output two different signals with respect to the displacement in each of the directions indicated by the arrows $X_1$ and $X_2$ of the objective lens. However, it is also possible to detect the displacement of the objective lens holder 2 by the use of only one detector.

Figure 7:
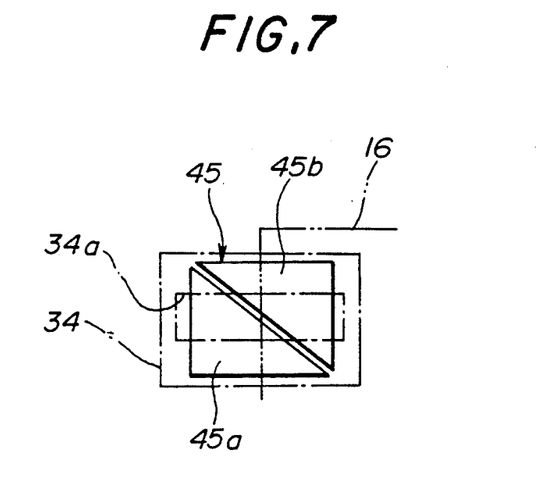
FIG. 7 is a frontal elevational view of an alternative embodiment of a detector.

FIG. 7 indicates a variation of the embodiment described above. In FIG. 7, instead of the two detectors 30 and 35 described above, a detector that includes a light-emitting diode 32, a detector 45 having two light receiving surfaces and a slit 34 is used. In this case, the light receiving surfaces 45a and 45b are illuminated from the light emitting diode in accordance with the position of the interrupter plate 16. The difference between the signals output from these light-receiving surfaces 45a and 45b are used as the basis to detect the position of the objective lens 3. That is, that by connecting the light-receiving surfaces 45a and 45b to the amplifiers 39 and 40 indicated in FIG. 6, it is possible to obtain the same effect as that of the embodiment as described above, by only using one detector.

Figure 8:
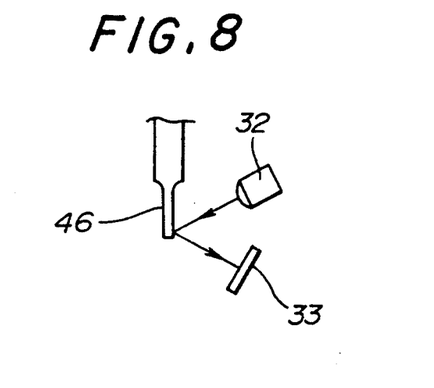
FIG. 8 is a plan view of an another alternative embodiment of a detector.

In addition, as is shown in FIG. 8, instead of the above described detectors 30 and 35, it is possible to use a detector so that light from the light-emitting diode 32 is reflected by a reflector plate 46 provided to the objective lens holder 2 and for this reflected light to be received by a photo diode 33. In this case, the amounts of light irradiating the reflector plate 46 change according to the displacement of the objective lens holder 2.

In addition, a detector that detects the position of the objective lens 3 can be a magnetic sensor or the like, or some other type of sensor and is not limited to the optical sensor described above.

As has been described in the above, in an objective lens drive apparatus according to the present invention, it is possible to maintain an objective lens at a required position on the base member even if a force corresponding to an acceleration when the base member moves, is applied to the objective lens. Accordingly, in the optical disk apparatus to which this objective lens drive apparatus is applied, it is possible to accurately detect track cross signals expressing the passage of a track on an optical disk recorded surface, so that this track cross signal can be used as the basis for the accurate measurement of the speed of movement of the base member and the objective lens. It then becomes possible to have stable high speed seek operation.

The present invention is not limited to the embodiment described above, and variations and modifications may be made without departing from the scope the present invention.

What is claimed is:

1. An objective lens drive apparatus suitable for use in an optical disk apparatus comprising:

a base member disposed so as to oppose a recording surface of an optical disk upon which information has been recorded, and so as to be movable in a direction of a radius of said optical disk;

a supporting mechanism, provided on said base member, for supporting an objective lens so as to be movable in the direction of the radius of said optical disk, said objective lens focusing a light beam from an external recording system onto the recording surface of said optical disk, said supporting mechanism having an elastic member which is provided between said objective lens and said base member, said elastic member being bendable to move in the direction of the radius of said optical disk;

a drive mechanism acting upon said supporting mechanism to move said objective lens with respect to said base member, in the direction of the radius of said optical disk, said drive mechanism having a magnet fixed to said base member and a magnetic coil coupled to the objective lens, said magnetic coil generating a force in the direction of the radius of said optical disk due to mutual magnetic interaction with said magnet;

displacement detection means for detecting a displacement, in the direction of the radius of said optical disk, of said objective lens on said base member, said displacement detection means having a light source irradiating light in a predetermined direction, a light-receiving element receiving light from said light source and outputting a signal in accordance with the amount of light received, and a mechanism changing the amount of light reaching said light receiving element from said light source, in accordance with said displacement of said objective lens, said mechanism having an interrupter plate coupled to said objective lens and moving between said light source and said light receiving element, in the direction of the radius of said optical disk, so that said interrupter plate alters the amount of light from said light source applied to said light receiving element in accordance with said displacement of said objective lens; and control means for controlling said drive mechanism in accordance with said signal from said displacement detection means, said control means having current control means for controlling the amount and direction of a current flowing in said magnetic coil so that said objective lens is maintained at a required position on said base member.

2. An objective lens drive apparatus as claimed in claim 1 wherein said displacement detection means further comprises a slit plate in an optical path leading from said light source to said receiving element, said slit plate having a long slit formed in the direction of said radius of an optical disk so that light from said light source passes through said slit and is irradiated to said light receiving element.

3. An objective lens drive apparatus as claimed in claim 1 wherein said light receiving element has two light receiving surfaces, and output two signals corresponding to amounts of light irradiated to each of the light receiving surfaces, said mechanism changing the amount of light that reaches each light receiving surface from said light source, in accordance with said displacement of said objective lens.

4. An objective lens drive apparatus as claimed in claim 3 wherein said control means has a control signal generation means for generating a control signal corresponding to a difference in signals outputted from said light receiving elements corresponding to two light receiving surfaces.

5. An objective lens drive apparatus as claimed in claim 1 wherein said displacement detection means has a first detector outputting a detection signal corresponding to said displacement of said objective lens, a level of said detection signal becoming large when said objective lens moves in a first direction and said level of said detection signal becoming small when said objective lens moves in a second direction opposite said first direction, and a second detector outputting a detection signal corresponding to said displacement of said objective lens, a level of said detection signal becoming large when said objective lens moves in said second direction and said level of said detection signal becoming small when said objective lens moves in said first direction.

6. An objective lens drive apparatus as claimed in claim 5 wherein each of said first detector and said second detector has a light source irradiating light in a predetermined direction, a light receiving element receiving light from said light source and outputting signal corresponding to an amount of light received, and said mechanism has an interrupter plate for each of said detectors for changing an amount of light reaching said light receiving element from said light source of each of said detectors, in accordance with said displacement of said objective lens.

7. An objective lens drive apparatus as claimed in claim 6 wherein each of said first detector and said second detector has a slit plate in an optical path leading from said light source to said light receiving element, said slit place having a long slit formed in said direction of said radius of said optical disk so that light from said light source passes through said slit and is irradiated to said light receiving element.

8. An objective lens drive apparatus as claimed in claim 5 wherein said control means has a control signal generation means for generating a control signal corresponding to a difference in detection signals from said first detector and said second detector, said control means controlling said drive mechanism on the basis of said control signal.

9. An objective lens drive apparatus suitable for use in an optical disk apparatus comprising:
   a base member disposed so as to oppose a recording surface of an optical disk upon which information has been recorded, and so as to be movable in a direction of a radius of said optical disk;
   a supporting mechanism, provided on said base member, for supporting an objective lens so as to be movable in the direction of the radius of said optical disk, said objective lens focusing a light beam from an external recording system onto the recording surface of said optical disk, said supporting mechanism having an elastic member which is provided between said objective lens and said base member, said elastic member being bendable to move in the direction of the radius of said optical disk;
   a drive mechanism acting upon said supporting mechanism to move said objective lens with respect to said base member, in the direction of the radius of said optical disk, said drive mechanism having a magnet fixed to said base member and a magnetic a force in the direction of the radius of said optical disk due to mutual magnetic interaction with said magnet;
   displacement detection means for detecting a displacement, in the direction of the radius of said optical disk, of said objective lens on said base member, said displacement detection means having a light source irradiating light in a predetermined direction, a light-receiving element receiving light from said light source and outputting a signal in accordance with the amount of light received, and a mechanism changing the amount of light reaching said light receiving element from said light source, in accordance with said displacement of said objective lens, said mechanism having a reflector plate coupled to said objective lens and moving between said light source and said light receiving element, in the direction of the radius of said optical disk, said reflector plate reflecting light from said light source to said light receiving element so that said reflector plate alters the amount of light from said light source applied to said light receiving element in accordance with said displacement of said objective lens; and
   control means for controlling said drive mechanism in accordance with said signal from said displacement detection means, said control means having current control means for controlling the amount and direction of a current flowing in said magnetic coil so that said objective lens is maintained at a required position on said base member.

* * * * *

UNITED STATES PATENT AND TRADEMARK OFFICE
CERTIFICATE OF CORRECTION

PATENT NO. : 5,216,648
DATED : June 1, 1993
INVENTOR(S) : Yasushi Noda et al

It is certified that error appears in the above-identified patent and that said Letters Patent is hereby corrected as shown below:

CLAIM 3, col. 8, line 51, delete "output" and substitute therefor ---outputs---; CLAIM 7, col. 9, line 24, delete "place" and substitute therefor ---plate---; CLAIM 9, col. 10, lines 12-13, after the word magnetic, insert ---coil coupled to the objective lens, said magnetic coil generating---.

Signed and Sealed this

Twenty-seventh Day of September, 1994

Attest:

BRUCE LEHMAN

Attesting Officer

Commissioner of Patents and Trademarks